United States Patent
Aminaka et al.

(10) Patent No.: US 10,117,148 B2
(45) Date of Patent: Oct. 30, 2018

(54) RADIO COMMUNICATION SYSTEM, BASE STATION, COMMUNICATION METHOD, MOBILE STATION, AND COMPUTER-READABLE MEDIUM

(71) Applicant: NEC CORPORATION, Tokyo, Japan (JP)

(72) Inventors: Hiroaki Aminaka, Tokyo (JP); Yasuhiro Mizukoshi, Tokyo (JP); Ippei Akiyoshi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/151,218

(22) Filed: May 10, 2016

(65) Prior Publication Data
US 2016/0255558 A1 Sep. 1, 2016

Related U.S. Application Data

(63) Continuation of application No. 14/233,273, filed as application No. PCT/JP2012/003036 on May 9, 2012, now Pat. No. 9,380,505.

(30) Foreign Application Priority Data

Aug. 12, 2011 (JP) ................. 2011-176785

(51) Int. Cl.
*H04W 36/14* (2009.01)
*H04W 36/28* (2009.01)
(Continued)

(52) U.S. Cl.
CPC ....... *H04W 36/14* (2013.01); *H04W 36/0016* (2013.01); *H04W 36/28* (2013.01);
(Continued)

(58) Field of Classification Search
CPC ........ H04W 36/14; H04W 36/00; H04L 12/28
See application file for complete search history.

(56) References Cited

U.S. PATENT DOCUMENTS

2004/0233862 A1 11/2004 Huang et al.
2010/0075679 A1* 3/2010 Tenny ............... H04W 36/0066
455/436

(Continued)

FOREIGN PATENT DOCUMENTS

JP 2004007279 A 1/2004
JP 2008512965 A 4/2008
(Continued)

OTHER PUBLICATIONS

Communication dated Jan. 17, 2017, issued by the Japan Patent Office in corresponding Japanese Application No. 2016-080302.
(Continued)

*Primary Examiner* — Myron K Wyche
(74) *Attorney, Agent, or Firm* — Sughrue Mion, PLLC

(57) ABSTRACT

A base station (1) is connectable to a mobile station (4) by a plurality of Radio Access Technologies (RATs) including first and second RATs. The base station (1) is configured to be able to use a communication path (400) that passes through a first upstream network (140) corresponding to the first RAT, when the mobile station (4) performs communication via the second RAT. This enables, for example, efficient use of the upstream networks when the Multi-RAT base station (1) supports a plurality of upstream networks.

18 Claims, 13 Drawing Sheets

(51) Int. Cl.
*H04W 36/00* (2009.01)
*H04W 88/10* (2009.01)
*H04W 88/06* (2009.01)
*H04W 88/16* (2009.01)

(52) U.S. Cl.
CPC ............ *H04W 88/06* (2013.01); *H04W 88/10* (2013.01); *H04W 88/16* (2013.01)

(56) References Cited

U.S. PATENT DOCUMENTS

| | | | |
|---|---|---|---|
| 2010/0220731 A1* | 9/2010 | Diab | H04L 12/4641 370/395.53 |
| 2010/0317357 A1 | 12/2010 | Miki et al. | |
| 2012/0163248 A1* | 6/2012 | Chin | H04W 36/14 370/280 |

FOREIGN PATENT DOCUMENTS

| | | |
|---|---|---|
| JP | 2009512354 A | 3/2009 |
| JP | 2009100210 A | 5/2009 |
| JP | 2009-290459 A | 12/2009 |
| WO | 2009/057782 A1 | 5/2009 |
| WO | 2010094319 A1 | 8/2010 |

OTHER PUBLICATIONS

3GPP TS 23.401 V10.3.0, 3rd Generation Partnership Project; Technical Specification Group Services and System Aspects; General Packet Radio Service (GPRS) enhancements for Evolved Universal Terrestrial Radio Access Network (E-UTRAN) access (Release 10), Mar. 2011, pp. 1-278.

3GPP TS 23.402 V10.3.0, 3rd Generation Partnership Project; Technical Specification Group Services and System Aspects; Architecture enhancements for non-3GPP accesses (Release 10), Mar. 2011, pp. 1-227.

Communication dated Apr. 29, 2015 from the European Patent Office in counterpart application No. 12823950.6.

Tomici et al., "Multi-RAT Traffic Offloading Solutions for the Banwidth Crunch Problem," Application and Technology Conference, 2011, XP31880722, pp. 1-6 (6 pages total).

Yuk et al., "Coordinated AP for tightly coupled BS-AP interworking for Multi-RAT devices," Nov. 11, 2010, XP 17784260, pp. 1-8 (8 pages total).

Notification of Reasons for Refusal dated May 15, 2018 from the Japanese Patent Office in counterpart Japanese application No. 2017-082727.

* cited by examiner

RADIO COMMUNICATION SYSTEM, BASE STATION, COMMUNICATION METHOD, MOBILE STATION, AND COMPUTER-READABLE MEDIUM

CROSS-REFERENCE TO RELATED APPLICATION(S)

This application is a continuation of U.S. application Ser. No. 14/233,273 filed on Jan. 16, 2014, which is a National Stage of International Application No. PCT/JP2012/003036 filed on May 9, 2012, which claims priority from Japanese Patent Application No. 2011-176785, filed on Aug. 12, 2011, the contents of all of which are incorporated herein by reference in their entirety.

TECHNICAL FIELD

The present invention relates to Inter-RAT handover of a mobile station between radio access technologies (RATs) in a radio communication system including a base station that supports a plurality of radio access technologies.

BACKGROUND ART

To cope with the diversification of radio access technologies (RATs), 3GPP (3rd Generation Partnership Project) specifies handovers between RATs standardized by 3GPP, for example, a handover between UTRAN (UMTS Terrestrial Radio Access Network) and E-UTRAN (Evolved UTRAN) and a handover between E-UTRAN and GERAN (GSM/EDGE Radio Access Network) (see Non Patent Literature 1). Further, 3GPP has studied handovers between the RATs standardized by 3GPP and other RATs (non-3GPP RATs) (see Non Patent Literature 2). Specific examples of the non-3GPP RATs include a wireless LAN standardized by IEEE802.11, WiMAX (Worldwide Interoperability for Microwave Access) standardized by IEEE 802.16, and cdma2000 standardized by 3GPP2 (3rd Generation Partnership Project 2).

FIG. 14 is a diagram showing a network configuration example in the case of connecting a mobile station to a core network (EPC (Evolved Packet Core)) of 3GPP via a plurality of RATs, which has been studied by 3GPP. Referring to FIG. 14, a mobile station (UE) 4 supports a plurality of RATs including E-UTRAN, UTRAN, and a non-3GPP RAT. A base station (eNB) 11 supports E-UTRAN specified by 3GPP, generates an E-UTRAN cell 10, and is connected to the mobile station (UE) 4. The base station (eNB) 11 relays user data between an EPC 40 and the mobile station 4.

The EPC 40 is a core network corresponding to E-UTRAN specified by 3GPP. The EPC 40 includes an S-GW (Serving Gateway) 41, a P-GW (Packet Data Network Gateway) 42, and an MME (Mobility Management Entity) 43. The S-GW 41 and the P-GW 42 are transfer nodes that transfer user data. The P-GW 42 functions as a gateway to an external network 70, and terminates a communication path (i.e. an EPS (Evolved Packet System) bearer) between the mobile station 4 and the EPC 40. The external network 70 is called PDN (Protocol Data Network) in 3GPP. The MME 43 performs mobility management and bearer management for the mobile station (UE) 4. The bearer management performed by the MME 43 includes management of information (such as a QoS class, a bearer ID, and bearer path information) relating to a configuration of the communication path (i.e. the EPS bearer) between the mobile station (UE) 4 and the P-GW 42, and signaling for bearer setup to the base station (eNB) 11, the mobile station (UE) 4, the S-GW 41, and the like.

A base station (NB) 21 supports UTRAN specified by 3GPP, generates a UTRAN cell 20, and is connected to the mobile station (UE) 4. The base station (NB) 21 relays user data between the mobile station 4 and an upstream network including an RNC (Radio Network Controller) 22 and a GPRS packet core 50. The RNC 22 is a node that performs radio resource management for the UTRAN including the base station (NB) 21.

The GPRS packet core 50 is a core network corresponding to UTRAN specified by 3GPP. The GPRS packet core 50 includes an SGSN (Serving GPRS Support Node) 51 serving as a control node and a transfer node. The SGSN 51 performs mobility management and bearer management for the mobile station (UE) 4, and performs processing of transferring user data. Uplink user data transmitted from the mobile station (UE) 4 belonging to the base station (NB) 21 is transferred to the EPC 40 via the RNC 22 and the SGSN 51, and is transferred to the external network 70 via the P-GW 42. Downlink user data is also transferred via the EPC 40 and the GPRS packet core 50 in the same manner as the uplink user data.

A base station (AP (Access Point)) 31 supports a non-3GPP RAT, such as cdma2000, WiMAX, or a wireless LAN, generates a non-3GPP cell 30, and is connected to the mobile station (UE) 4. The base station (AP) 31 relays user data between a non-3GPP upstream network 60 and the mobile station 4.

An HLR (Home Location Register)/HSS (Home Subscriber Server) 44 manages an identifier, authentication information, positional information, and the like of the mobile station (UE) 4. The HLR/HSS 44 collaborates with the MME 43 and the SGSN 51, and performs authentication processing when the mobile station (UE) 4 attaches to the EPC 40 and the GPRS packet core 50.

The non-3GPP upstream network 60 is an upstream network corresponding to the non-3GPP RAT supported by the base station (AP) 31. The non-3GPP upstream network 60 includes a transfer node 61 that transfers user data, and a control node 62 that performs, for example, bearer management and mobility management. Uplink user data transmitted from the mobile station (UE) 4 belonging to the base station (AP) 31 is transferred to the EPC 40 via the transfer node 61, and is transferred to the external network 70 via the P-GW 42. Downlink user data is also transferred via the EPC 40 and the non-3GPP upstream network 60 in the same manner as the uplink user data.

The non-3GPP upstream network 60 includes a RAN node and a core network node. In the case of WiMAX, the non-3GPP upstream network 60 includes, for example, an ASN GW (Access Network Gateway) disposed in a radio access network (WiMAX Access Service Network (ASN), and a HA (Home Agent) disposed in a core network (Core Services Network (CSN)). Each of the ASN GW and the HA corresponds to both the transfer node 61 and the control node 62.

As described above, in the architecture shown in FIG. 14, user data transmitted and received between the external network 70 and the mobile station 4 is transferred via the P-GW 42 disposed in the EPC 40. In other words, in the architecture shown in FIG. 14, the P-GW 42 disposed in the EPC 40 operates as an anchor node when the mobile station (UE) 4 performs a handover between the base stations 11, 21, and 31 which support different RATs.

CITATION LIST

Patent Literature

[NPL1] 3GPP TS 23.401 v10.3.0, "General Packet Radio Service (GPRS) enhancements for Evolved Universal Terrestrial Radio Access Network (E-UTRAN) access", March 2011
[NPL2] 3GPP TS 23.402 v10.3.0, "Architecture enhancements for non-3GPP accesses", March 2011

SUMMARY OF INVENTION

Technical Problem

The inventors of the present application have studied a connection between upstream networks and a Multi-RAT base station that supports a plurality of RATs. As with the relation between E-UTRAN and EPC described above, a relation between a RAT and an upstream network is determined in advance. Accordingly, it is generally considered that the Multi-RAT base station is configured to be connected to a plurality of upstream networks and establish a communication path for transfer of user data between the base station and the upstream network corresponding to the RAT used for connection with a mobile station. However, the inventors of the present application have found that such selection of an upstream network by the Multi-RAT base station is not always efficient.

For example, an Inter-RAT handover under the Multi-RAT base station will now be considered. As described above, Non Patent Literatures 1 and 2 disclose an Inter-RAT handover. Before and after such an Inter-RAT handover, the upstream network to which the mobile station (UE) 4 belongs is changed, so that the route of a communication path (e.g., an EPS bearer, a PDN connection, or an IPsec tunnel) for user data is also changed. This necessitates signaling for reserving resources used for the communication path for user data after the handover. In addition, Non Patent Literature 2 discloses an Inter-RAT handover between a 3GPP RAT (e.g., UTRAN, E-UTRAN) and a non-3GPP RAT (e.g., a wireless LAN, WiMAX, cdma2000). In the case of a handover between RATs compliant with different standards, an authentication system for the mobile station (UE) 4 is not generally shared between two different upstream networks used before and after the handover. Therefore, in the handover between RATs compliant with different standards, a handover target system (upstream network) needs to perform the re-authentication processing for the mobile station (UE) 4. In general, the authentication processing is performed in a manner similar to that during an initial connection (attach) of the mobile station (UE) 4 to an upstream network.

When the Multi-RAT base station performs the Inter-RAT handover disclosed in Non Patent Literatures 1 and 2, it takes a long time to perform the bearer switching processing and authentication processing for the mobile station (UE). This increases the possibility of a failure of the handover.

Not only in the case of the Inter-RAT handover, but also in the case of establishing a communication path with an upstream network in response to the initial attach of the mobile station, it is desirable to be able to select an upstream network more flexibly, irrespective of the existing relation between a RAT and an upstream network. An object of the present invention is to provide a radio communication system, a base station, a communication method, a mobile station, and a program, which are capable of efficiently using upstream networks when the Multi-RAT base station supports a plurality of upstream networks.

Solution to Problem

A first aspect includes a radio communication system. The radio communication system includes a base station and a plurality of upstream networks. The base station is configured to be connectable to a mobile station via a plurality of radio access technologies including first and second radio access technologies. The upstream networks include a first upstream network corresponding to the first radio access technology and a second upstream network corresponding to the second radio access technology. Further, the base station is configured to be able to use a first communication path that passes through the first upstream network, when the mobile station performs communication via the second radio access technology.

A second aspect includes a base station that is connectable to a mobile station by a plurality of radio access technologies including first and second radio access technologies. The base station includes a communication path control unit configured to be able to use a communication path that passes through a first upstream network corresponding to the first radio access technology, when the mobile station performs communication via the second radio access technology.

A third aspect includes a communication method for a base station that is connectable to a mobile station by a plurality of radio access technologies, including first and second radio access technologies. The method includes using a first communication path that passes through a first upstream network corresponding to the first radio access technology, when the mobile station performs communication via the second radio access technology.

A fourth aspect includes a mobile station used in a radio communication system. The radio communication system includes a plurality of upstream networks and a base station. The plurality of upstream networks include a first upstream network corresponding to a first radio access technology and a second upstream network corresponding to a second radio access technology. The base station is configured to be connectable to the mobile station by a plurality of radio access technologies including the first and second radio access technologies, and is configured to be able to use a first communication path that passes through the first upstream network when the mobile station performs communication via the second radio access technology. The mobile station according to this aspect is configured to be connected to the base station via at least one of the first and second radio access technologies.

A fifth aspect includes a program for causing a computer to execute the method according to the third aspect described above.

Advantageous Effects of Invention

According to the above-mentioned aspects, it is possible to provide a radio communication system, a base station, a communication method, a mobile station, and a program, which are capable of efficiently using upstream networks when a Multi-RAT base station supports a plurality of upstream networks.

DESCRIPTION OF EMBODIMENTS

Figure 1:
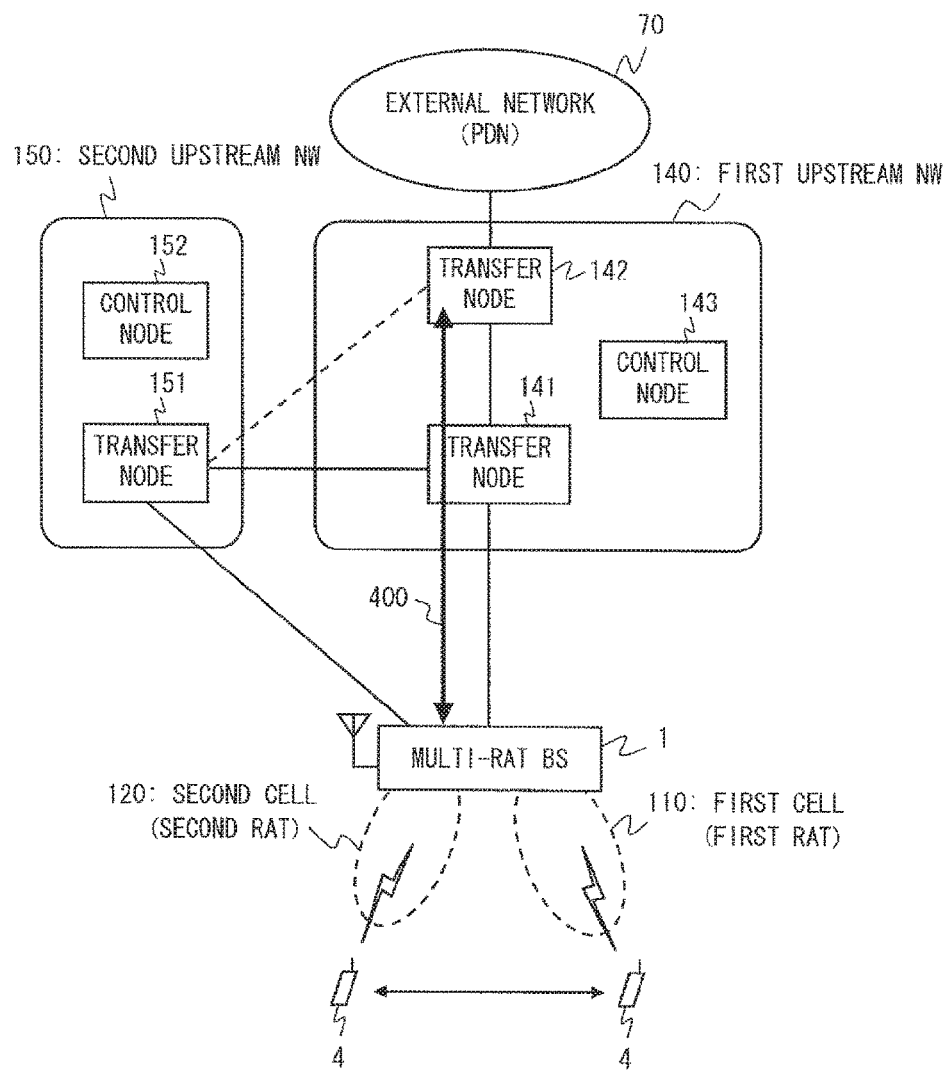
FIG. 1 is a diagram showing a configuration example of a radio communication system including a base station according to a first embodiment.

Hereinafter, exemplary embodiments will be described in detail with reference to the drawings. In the drawings, the same or corresponding elements are denoted by the same reference numerals, and a repeated explanation is omitted as needed for clarity of the explanation.

First Embodiment

FIG. 1 is a diagram showing a configuration example of a radio communication system including a Multi-RAT base station 1 according to this embodiment. The base station 1 supports at least two different RATs and is connectable to a mobile station by the at least two RATs. In the example shown in FIG. 1, the base station 1 generates a first cell 100 by a first RAT and a second cell 120 by a second RAT, and communicates with a mobile station 4. The base station 1 is connectable to a first upstream network 140 corresponding to the first RAT and to a second upstream network 150 corresponding to the second RAT.

The first upstream network 140 includes transfer nodes 141 and 142 and a control node 143. The transfer nodes 141 and 142 relay user data, which is transmitted and received between the base station 1 and an external network 70, by using a communication path 400 that is established between the base station 1 and the transfer node 141. The communication path 400 is a physically or logically established communication path that is used for transfer of user data. User data is relayed between the mobile station 4 and the transfer node 141 through the communication path 400 and a radio bearer (radio link) between the base station 1 and the mobile station 4. The communication path 400 is, for example, an S1 bearer, an S5/S8 bearer, a GTP (GPRS Tunneling Protocol) tunnel, a GRE (Generic Routing Encapsulation) tunnel of PMIP (Proxy Mobile IP), or an IPsec tunnel, or a combination of at least two of them.

The transfer node 142 operates as a gateway to the external network 70, and terminates the communication path 400 that is established between the transfer node 142 and the base station 1 to transfer user data. The control node 143 performs mobility management and bearer management for the mobile station 4. The bearer management performed by the control node 143 includes management of information (such as a QoS class, a bearer ID, and bearer path information) relating to a configuration of communication paths, including the communication path 400 between the mobile station 4 and the transfer node 142, and signaling for bearer setup to the base station 1, the mobile station 4, the transfer node 141, and the like. The transfer nodes 141 and 142 and the control node 143 shown in FIG. 1 are merely illustrated as functional elements. That is, at least two of the transfer node 141, the transfer node 142 and the control node 143 may be realized by a single physical node. Alternatively, the functions of the three nodes may be realized by four or more physical nodes.

The second upstream network 150 includes a transfer node 151 and a control node 152. The transfer node 151 has a function of relaying user data between the base station 1 and the transfer node 141 (or the transfer node 142). The control node 152 performs mobility management and bearer management for the mobile station 4 connected to a RAN corresponding to the second RAT. The transfer node 151 and the control node 152 shown in FIG. 1 are merely illustrated as functional elements. That is, the transfer node 151 and the control node 152 may be realized by a signal physical node. Alternatively, the functions of the two nodes may be shared by three or more physical nodes.

The mobile station 4 supports the first and second RATs, and is connectable to the first cell 110 and the second cell 120. The mobile station 4 may be selectively connected to one of the first cell 110 and the second cell 120. The mobile station 4 may be connected simultaneously to both the first cell 110 and the second cell 120. In other words, the mobile station 4 is connectable to the base station 1 by selectively using one of the first and second RATs, or by using both the first and second RATs. The mobile station 4 may be configured to be able to perform handover between the two RATs (between the cell 110 and the cell 120).

The Multi-RAT base station 1 according to this embodiment is configured to be able to use the communication path 400, which passes through the first upstream network 140 without passing through the second upstream network 150, for data transfer between the mobile station 4 and the external network 70 in the case of performing communication with the mobile station 4 via the second RAT. In other words, the base station 1 can transfer user data without using the communication path (such as a GTP tunnel, a GRE tunnel, or an IPsec tunnel) that passes through the second upstream network 150 corresponding to the second RAT. To put it another way, the base station 1 can transfer user data by using another upstream network (the first upstream network 140) different from the upstream network (the second upstream network 150) linked to the second RAT for performing communication with the mobile station 4.

Figure 2:
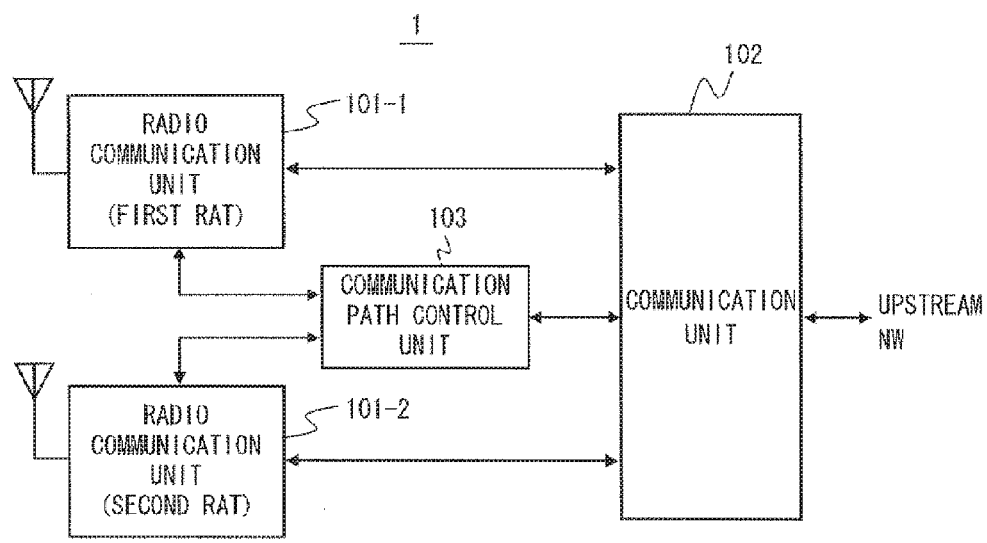
FIG. 2 is a block diagram showing a configuration example of the base station according to the first embodiment.

FIG. 2 is a block diagram showing a configuration example of the Multi-RAT base station 1. A radio communication unit 101-1 supports the first RAT, generates the first cell 110, and performs radio communication with the mobile station 4. A radio communication unit 101-2 supports the second RAT, generates the second cell 120, and performs radio communication with the mobile station 4.

A communication unit 102 is an interface used for communication with the first and second upstream networks 140 and 150. Specifically, the communication unit 102 transmits and receives user data and control message to and from the transfer node 141, the control node 143, the transfer node 151, and the control node 152.

A communication path control unit 103 controls configuration of the communication paths between the base station 1 and each of the upstream networks 140 and 150. Specifically, the communication path control unit 103 may control an Inter-RAT handover for switching a connection with the mobile station 4 from the first RAT (the first cell 110) to the second RAT (the second cell 120), and may control configuration of the communication path during the handover.

The communication path control unit 103 may select a communication path, which is used for transfer of user data, from among communication paths (including the communication path 400) that pass through different routes in upstream networks (including the upstream networks 140 and 150). The communication path control unit 103 may select a communication path based on a predetermined condition. The predetermined condition may be determined in consideration of the respective states (a communication load, connectability of the base station 1, etc.) of the upstream networks. The predetermined condition may be determined in consideration of the RAT used by a nearby base station located in the vicinity of the base station 1.

Figure 3:
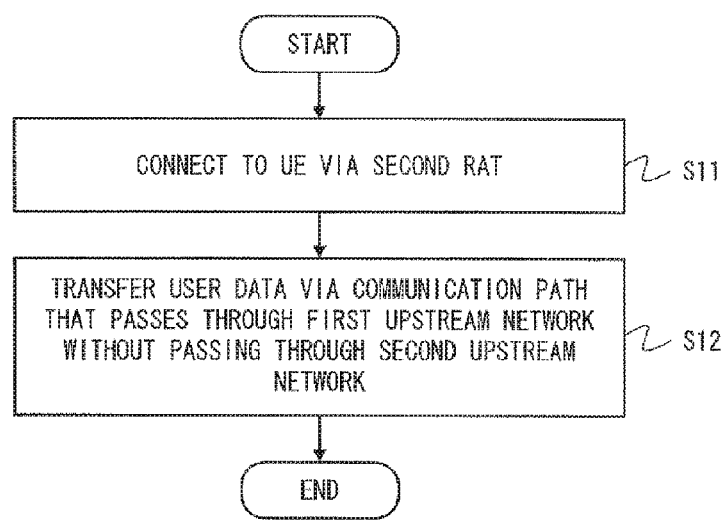
FIG. 3 is a flowchart showing an example of a communication operation of the base station according to the first embodiment.

FIG. 3 is a flowchart showing an example of the communication operation of the base station 1 according to this embodiment. In step S11, the base station 1 is connected to the mobile station 4 via the second RAT. In step S12, the base station 1 transmits and receives user data to and from the transfer node 142 by using the communication path 400 that passes through the first upstream network 140 without passing through the second upstream network 150.

As described above, the Multi-RAT base station 1 according to this embodiment can use, for transfer of user data, the communication path through the upstream network which does not correspond to the RAT used for connection of the Multi-RAT base station 1 with the mobile station 4. Therefore, according to this embodiment, the flexibility in configuration of the communication path between the base station and the upstream network can be improved in the radio communication system including the Multi-RAT base station.

Second Embodiment

The first embodiment described above illustrates the operation in which the Multi-RAT base station 1 uses, for transfer of user data, the communication path through the upstream network which does not correspond to the RAT used for connection of the Multi-RAT base station 1 with the mobile station 4. In this embodiment, a specific example of this operation will be described in which the configuration of the communication path is controlled during the Inter-RAT handover for switching the connection with the mobile station 4 from the first RAT (the first cell 110) to the second RAT (the second cell 120). A configuration example of a mobile communication system according to this embodiment may be similar to the example of the first embodiment shown in FIG. 1. The configuration of the Multi-RAT base station according to this embodiment may be similar to that of the block diagram shown in FIG. 2.

The base station 1 according to this embodiment controls the Inter-RAT handover for switching the connection with the mobile station 4 from the first RAT (the first cell 110) to the second RAT (the second cell 120). The control of the Inter-RAT handover by the base station 1 includes, for example, determining the execution of the Inter-RAT handover, preparing radio resources in a handover target (the first cell 110 or the second cell 120), and requesting the mobile station 4 to switch a connection destination cell (RAT).

Further, the base station 1 is configured so as not to change the route of the communication path 400, which is established between the base station 1 and the transfer node 142, before and after the Inter-RAT handover. In other words, when the mobile station 4 performs a handover from the first RAT (the first cell 110) to the second RAT (the second cell 120), the base station 1 continuously uses the communication path (bearer) 400, which is established before the handover, for transfer of user data even after the Inter-RAT handover, without changing the route of the communication path 400 so that it passes through the second upstream network 150.

The base station 1 may operate in the following manner to continuously use the communication path 400, which is established before the Inter-RAT handover, even after the handover. For example, the base station 1 may inhibit transmission, to the first and second upstream networks 140 and 150, of a control message for requesting to change the route of the communication path 400. Alternatively, the base station 1 may send the control message, which indicates that there is no need to change the route of the communication path 400, to the control node 143 of the first upstream network 140 and the control node 152 of the second upstream network 150. In still another alternative, the base station 1 may notify the control node 152 of the second upstream network 150 or an authentication system (not shown) that there is no need to re-authenticate the mobile station 4.

Upon receiving an attach request (authentication request) from the mobile station 4 to attach the second upstream network 150, the base station 1 may inhibit transfer of the attach request to the second upstream network 150. The base station 1 may also send, to the mobile station 4, a control message indicating that there is no need to send the attach request (authentication request) to attach the second upstream network 150. The control message sent to the mobile station 4 may be transmitted as a handover request. For example, the base station 1 may send a handover request including identification information indicating a special handover under the Multi-RAT base station.

As described above, a configuration example of the Multi-RAT base station 1 according to this embodiment may be similar to that shown in FIG. 2. However, in this embodiment, the communication path control unit 103 controls the Inter-RAT handover for switching the connection with the mobile station 4 from the first RAT (the first cell 110) to the second RAT (the second cell 120). More specifically, the communication path control unit 103 determines the execution of the Inter-RAT handover. Specific examples of handover triggering factors include degradation of the downlink reception quality of the mobile station 4, an increase in load of the base station 1, and a voluntary request from the mobile station 4. As a typical example, the communication path control unit 103 receives from the mobile station 4 a measurement report on the downlink radio quality, and determines initiation of a handover on condition that reception quality of an adjacent cell (e.g., the second cell 120) is better than that of the current cell (e.g., the first cell 110). The communication path control unit 103 requests the radio communication unit 101-2 to prepare radio resources of the handover target (e.g., the second cell 120), and requests the mobile station 4 to switch the connection destination cell.

Figure 4:
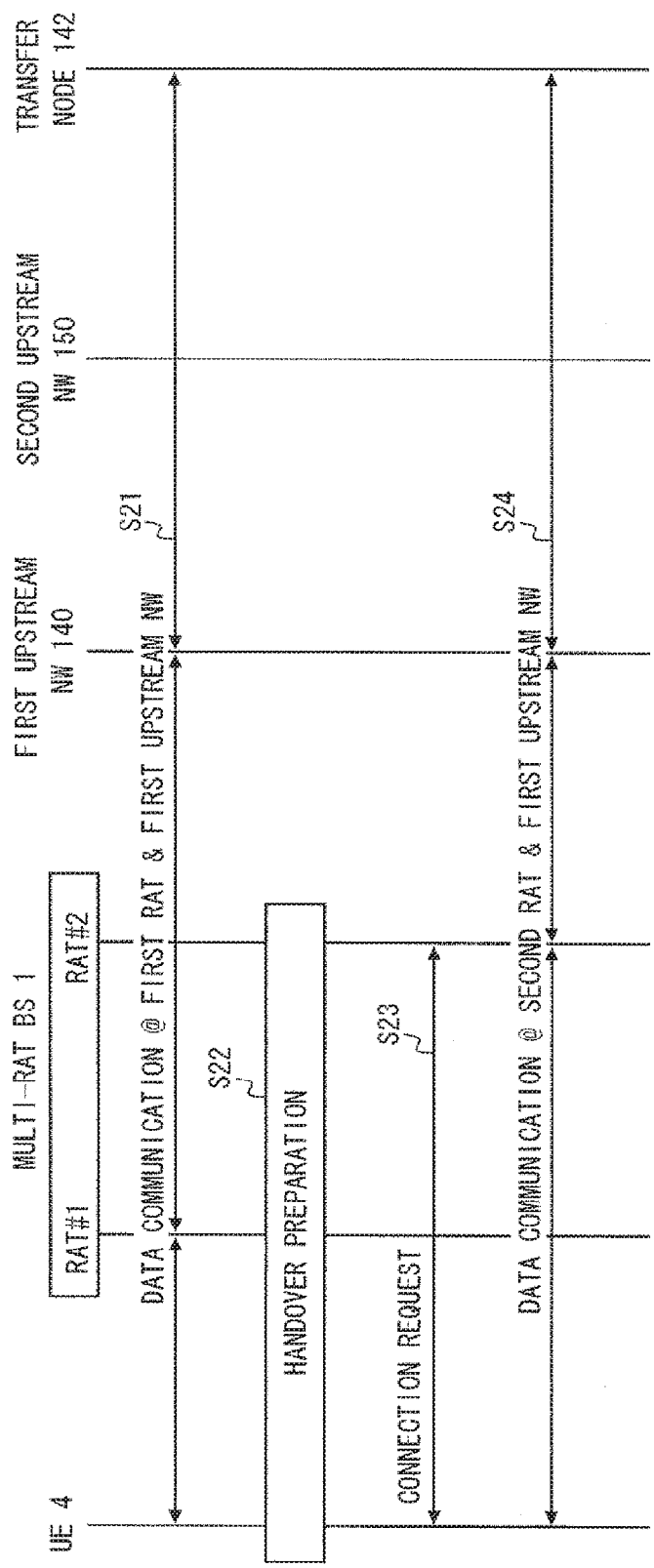
FIG. 4 is a sequence diagram showing an example of an Inter-RAT handover procedure according to a second embodiment.

Hereinafter, an Inter-RAT handover procedure according to this embodiment will be described. FIG. 4 is a sequence diagram showing an example of the Inter-RAT handover procedure according to this embodiment. In step S21, the mobile station 4 is connected to the Multi-RAT base station 1 via the first RAT (the first cell 110), and performs data communication with the transfer node 142 through the base station 1 and the first upstream network 140. As described above, the transfer node 142 is a gateway to the external network 70, and relays user data between the external network 70 and the communication path 400 which is established between the transfer node 142 and the mobile station 4.

In step S22, the base station 1 determines the execution of the Inter-RAT handover from the first RAT (the first cell 110) to the second RAT (the second cell 120), and the base station 1 and the mobile station 4 prepare for the Inter-RAT handover. The preparation for the Inter-RAT handover includes preparing radio resources of the second RAT (the second cell 120) as a handover target, and requesting from the base station 1 to the mobile station 4 to switch the connection destination cell (RAT). However, as described above, the base station 1 does not change the route of the communication path 400, which is established between the case station 1 and the transfer node 142, before and after the Inter-RAT handover. Accordingly, in the example shown in FIG. 4, the base station 1 inhibits transmission, to the first and second upstream networks 140 and 150, of the control message for requesting to change the route of the communication path 400.

In step S23, the mobile station 4 sends a connection request to the base station 1 via the second RAT, and is connected to the second cell 120. In step S24, the mobile station 4 is connected to the Multi-RAT base station 1 via the second RAT (the second cell 120), and performs data communication with the transfer node 142 through the base station 1 and the first upstream network 140.

Figure 5:
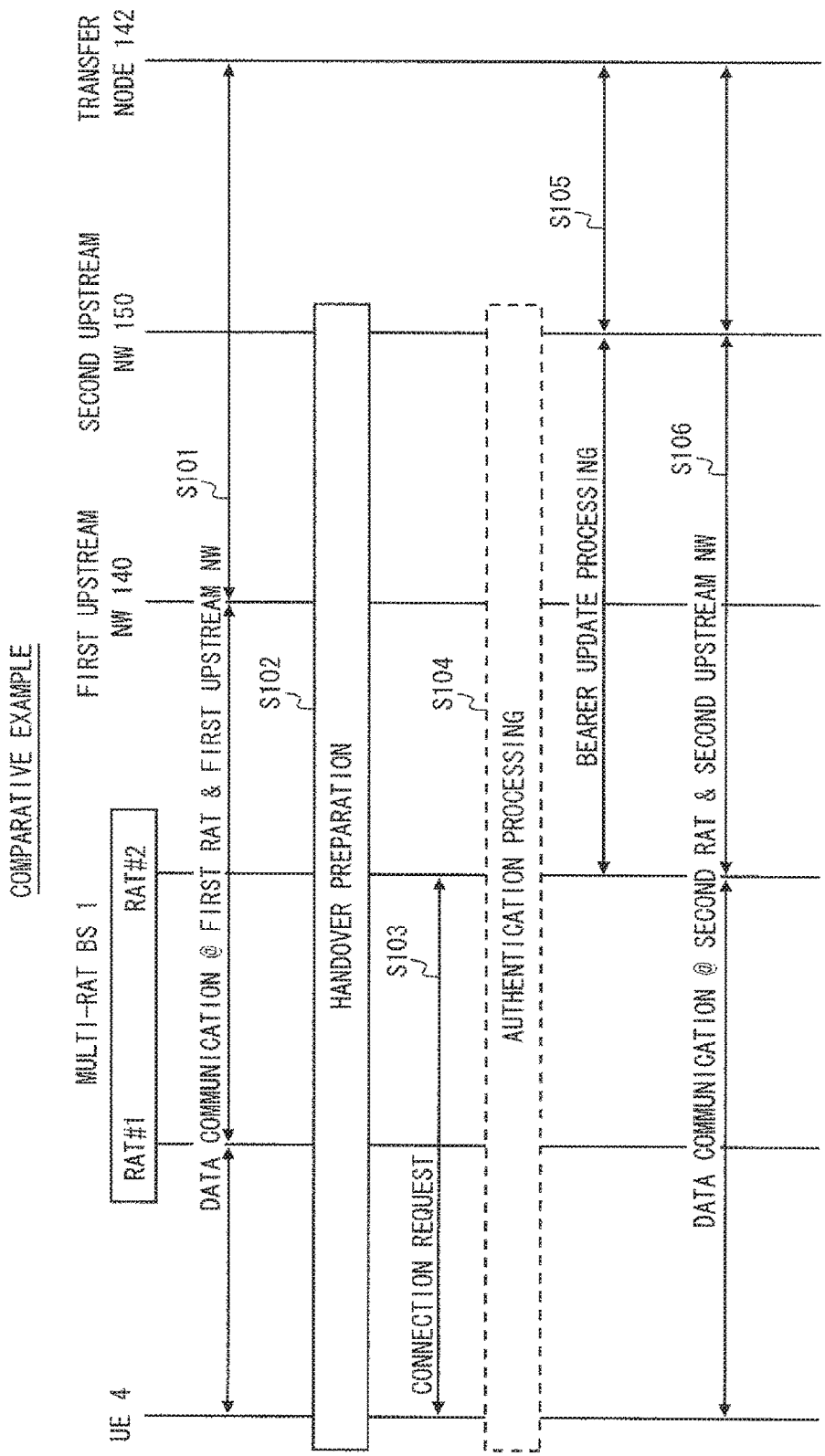
FIG. 5 is a sequence diagram showing an Inter-RAT handover procedure according to a comparative example.

For comparison with the handover procedure shown in FIG. 4, an example will be described in which the route of the communication path 400 is changed before and after the Inter-RAT handover. FIG. 5 is a sequence diagram showing an Inter-RAT handover procedure according to a comparative example. Step S101 is similar to step S21 shown in FIG. 4. Specifically, the mobile station 4 is connected to the Multi-RAT base station 1 via the first RAT (the first cell 110), and performs data communication with the transfer node 142 through the base station 1 and the first upstream network 140.

In step S102, the base station 1 determines the execution of the Inter-RAT handover from the first RAT (the first cell 110) to the second RAT (the second cell 120). At this time, the base station 1 performs signaling with at least one of the first and second upstream networks 140 and 150 so as to carry out bearer setup by reserving resource of the second upstream network 150. For example, the base station 1 sends a control message for requesting the control node 143 of the first upstream network 140 to relocate a bearer. Upon receiving the control message from the base station 1, the control node 143 sends a control message for requesting a bearer setup to the transfer node 151 or the control node 152 of the second upstream network 150. Then, the base station 1 requests the mobile station 4 to switch the connection destination cell (RAT) on condition that the bearer setup in the second upstream network 150 is completed.

In step S103, the mobile station 4 sends a connection request to the base station 1 via the second RAT, and is connected to the second cell 120. In step S104, the mobile station 4 which has been connected to the second cell 120 executes authentication processing with the second upstream network 150 corresponding to the second RAT. The authentication processing in step S104 may be omitted when an authentication system common to the first and second upstream networks 140 and 150 is used (for example, in the case of an EPC and a GPRS packet core as specified by 3GPP).

In step S105, the base station 1 sends a bearer switching request to the transfer node 142 via the second upstream network 150. In response to this request, the transfer node 142 executes reconfiguration of the bearer to change the route of the communication path 400 so that it passes through the second upstream network 150. In step S106, the mobile station 4 is connected to the Multi-RAT base station 1 via the second RAT (the second cell 120), and performs data communication with the transfer node 142 through the base station 1 and the second upstream network 150.

As is seen from FIGS. 4 and 5, in the handover procedure shown in FIG. 4, there is no need of reserving resources and establishing a bearer in the second upstream network 150, and there is no need of signaling for changing the route of the communication path 400. The authentication processing (step S104) of the mobile station 4 can also be omitted. Thus, according to the handover procedure shown in FIG. 4, the load of the handover processing can be reduced when the Inter-RAT handover of the mobile station 4 is performed between the two RATS managed by the Multi-RAT base station 1.

Figure 6:
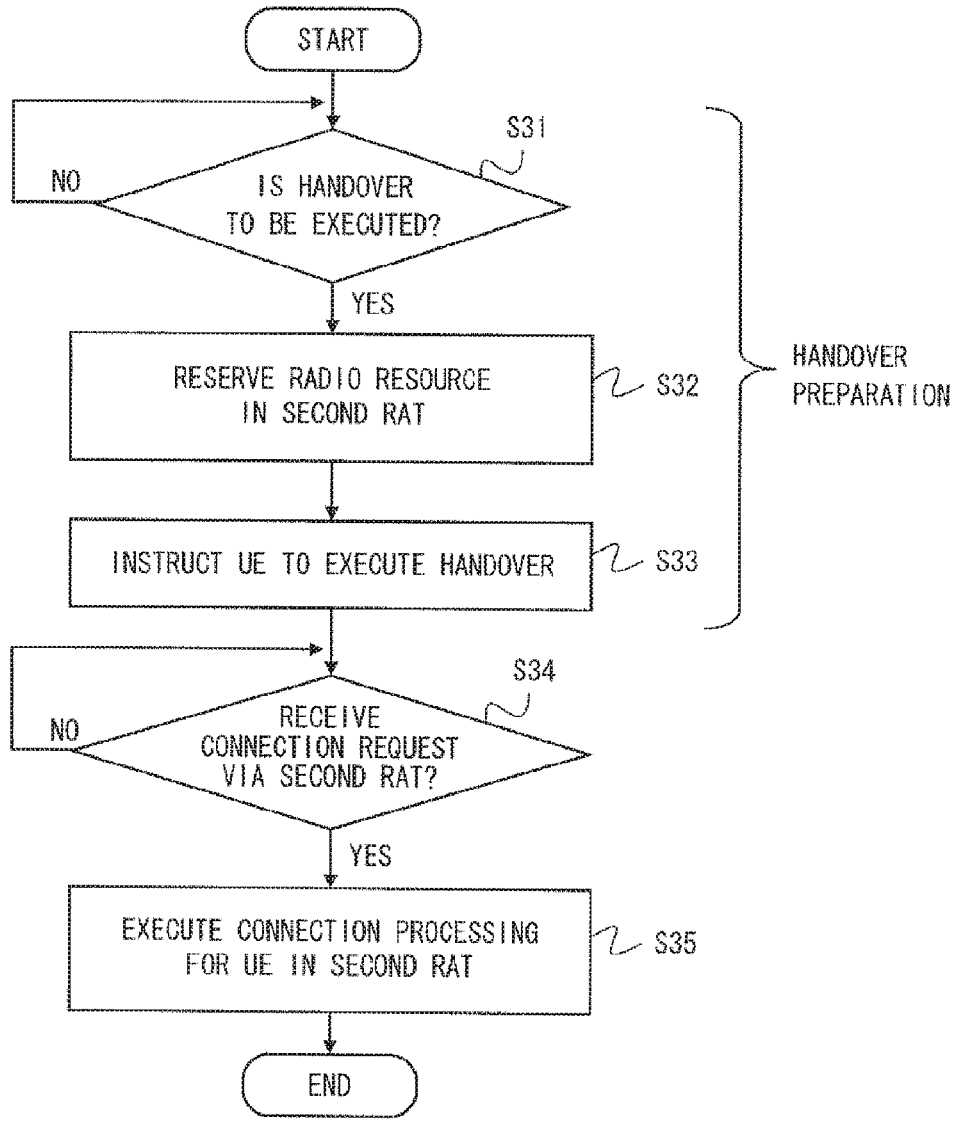
FIG. 6 is a flowchart showing a specific example of a procedure for executing an Inter-RAT handover by a base station according to the second embodiment.

FIG. 6 is a flowchart showing a specific example of the procedure for executing the Inter-RAT handover by the Multi-RAT base station 1. Steps S31 to S33 shown in FIG. 6 correspond to the handover preparation (step S22) shown in FIG. 4. Specifically, in step S31, the communication path control unit 103 of the base station 1 determines the execution of the Inter-RAT handover from the first RAT (the first cell 110) to the second RAT (the second cell 120). In step S32, the communication path control unit 103 collaborates with the radio communication unit 101-2 and reserves radio resources in the second RAT. In step S33, the communication path control unit 103 instructs, via the radio communication unit 101-1, the mobile station 4 to execute the handover.

In step S34, the communication path control unit 103 determines whether the connection request from the mobile station 4 has been received via the second RAT (the second cell 120). When the connection request from the mobile station 4 has been received (YES in step S34), the communication path control unit 103 collaborates with the radio communication unit 101-2 and executes connection processing for the mobile station 4. When the connection request from the mobile station 4 has not been received (NO in step S34), the communication path control unit 103 returns to step S34 to receive the connection request.

As described above, the Multi-RAT base station 1 according to this embodiment is configured not to change the route of the communication path 400, which is established between the base station 1 and the transfer node 142, before and after the Inter-RAT handover. In other words, when the mobile station 4 performs the Inter-RAT handover from the first RAT (the first cell 110) to the second RAT (the second cell 120), the base station 1 continuously uses the communication path (bearer) 400, which is established before the Inter-RAT handover, for transfer of user data even after the Inter-RAT handover, without changing the communication path 400 so that it passes through the second upstream network 150. This eliminates the need for the Multi-RAT base station 1 and the upstream networks 140 and 150 to execute processing for changing the route of the bearer, leading to a reduction in load of the processing required for the Inter-RAT handover.

Third Embodiment

In this embodiment, a modification of the Inter-RAT handover procedure described in the second embodiment will be described. The Inter-RAT handover procedure described with reference to FIG. 4 illustrates an example in which the control message requesting modification of the route of the communication path 400 is inhibited from being sent from the base station 1 to the upstream networks 140 and 150. This embodiment illustrates an example in which the control message indicating that there is no need to change the route of the communication path 400 is sent to at least one of the upstream networks 140 and 150 from the base station 1. A configuration example of a mobile communication system according to this embodiment may be similar to the example of the first embodiment shown in FIG. 1. The configuration of the Multi-RAT base station according to this embodiment may be similar to that of the block diagram shown in FIG. 2.

Figure 7:
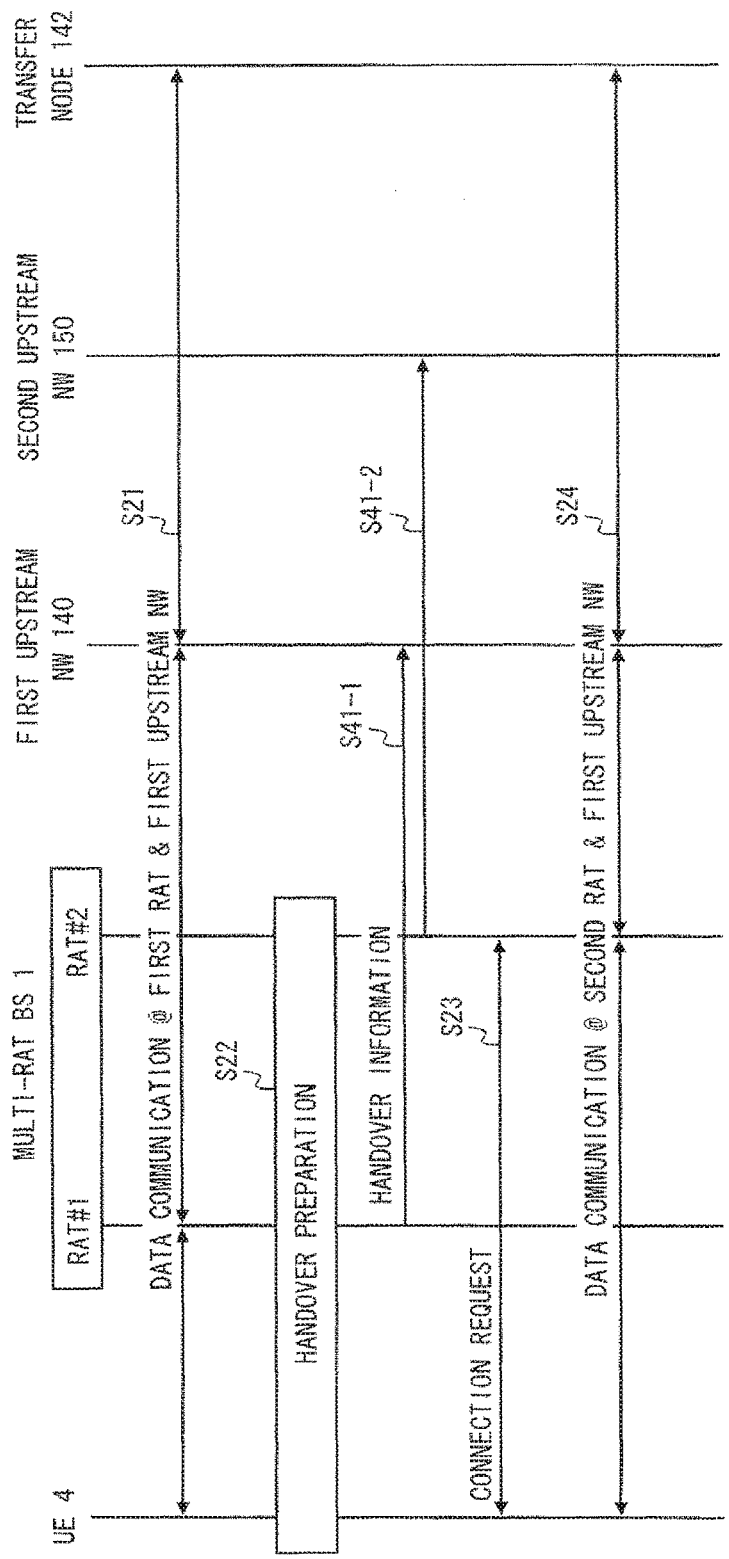
FIG. 7 is a sequence diagram showing an example of an Inter-RAT handover procedure according to a third embodiment.

FIG. 7 is a sequence diagram showing an example of the Inter-RAT handover procedure according to this embodiment. Processings and operations to be carried out in steps S21, S22, S23, and S24 shown in FIG. 7 are the same as those in the steps denoted by the same reference symbols as those in FIG. 4. In steps S41-1 and S41-2 shown in FIG. 7, the Multi-RAT base station 1 sends handover information to the upstream networks 140 and 150 respectively corresponding to the first RAT and the second RAT. The handover information notifies the upstream networks 140 and 150 that there is no need to change the route of the communication path 400. The handover information includes, for example, information indicating that the Inter-RAT handover is performed within the Multi-RAT base station. The handover information may also include an identifier (e.g., IMSI (International Mobile Subscriber Identity), TMSI (Temporary Mobile Subscriber Identity), or M-TMSI (MME-TMSI)) of the mobile station 4 that performs the Inter-RAT handover.

The base station 1 may send the handover information to only one of the upstream networks 140 and 150. Specifically, the base station 1 may send the handover information to one of the upstream networks 140 and 150 (e.g., the network 140) that includes a node (e.g., the control node 143) to be subjected to the control for changing a route of a bearer. The handover information may be sent from one of the upstream networks (e.g., the network 140) to the other upstream network (e.g., the network 150).

Figure 8:
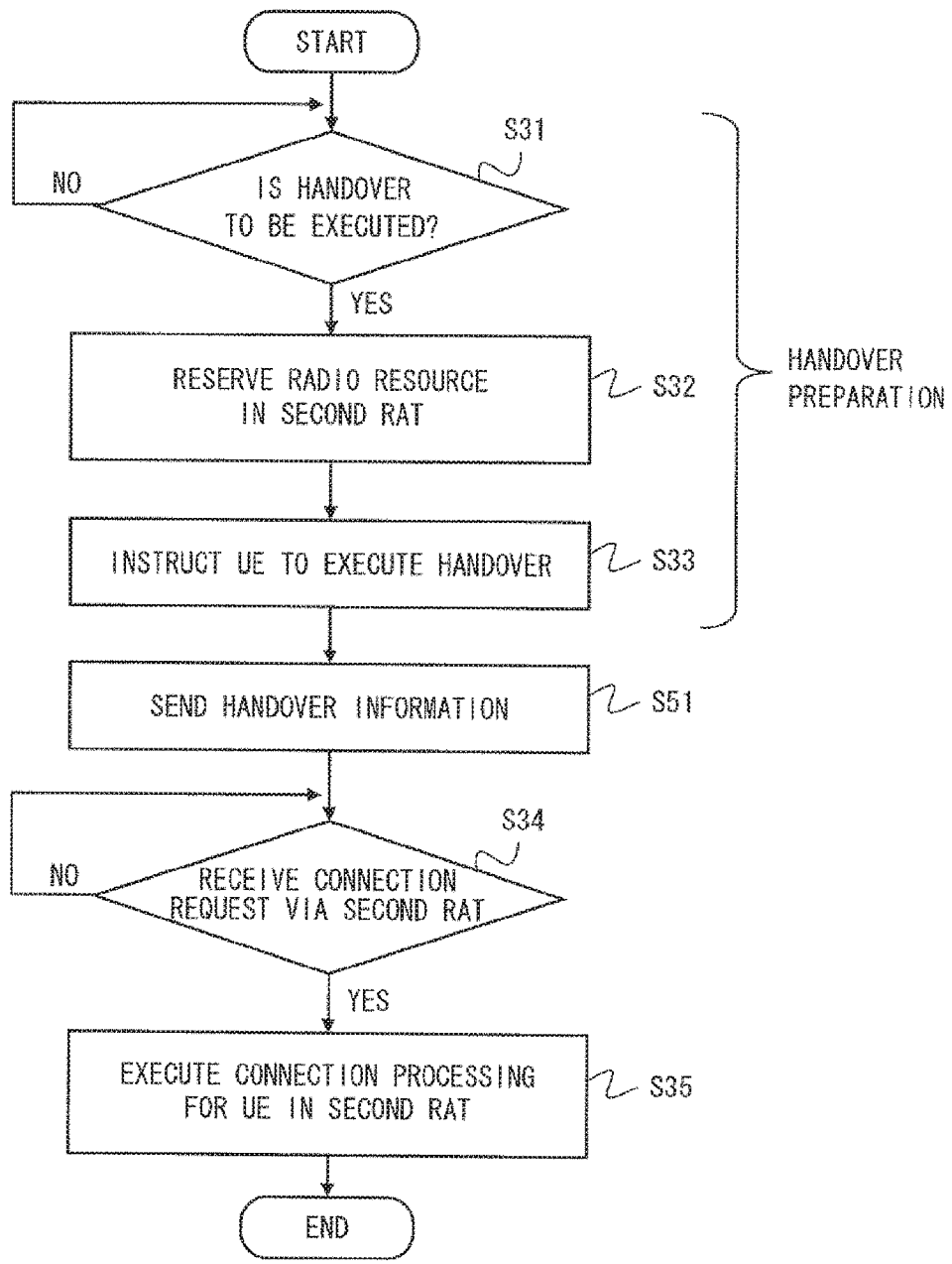
FIG. 8 is a flowchart showing a specific example of a procedure for executing an Inter-RAT handover by a base station according to the third embodiment.

FIG. 8 is a flowchart showing a specific example of the procedure for executing the Inter-RAT handover by the Multi-RAT base station 1 according to this embodiment. Processings and operations to be carried out in steps S31 to S35 shown in FIG. 8 are the same as those in the steps denoted by the same reference symbols as those in FIG. 6. In step S51 shown in FIG. 8, the communication path control unit 103 sends the handover information to at least one of the upstream networks 140 and 150 via the communication unit 102.

As described above, in this embodiment, the Multi-RAT base station 1 sends, to at least one of the upstream networks 140 and 150, the handover information for notifying that there is no need to change the route of the communication path 400, in the case of executing the Inter-RAT handover. This allows the upstream networks 140 and 150 to recognize that there is no need to change the route of the communication path 400, and also allows the upstream networks 140 and 150 to recognize a change of the cell to which the mobile station 4 belongs.

Fourth Embodiment

Figure 9:
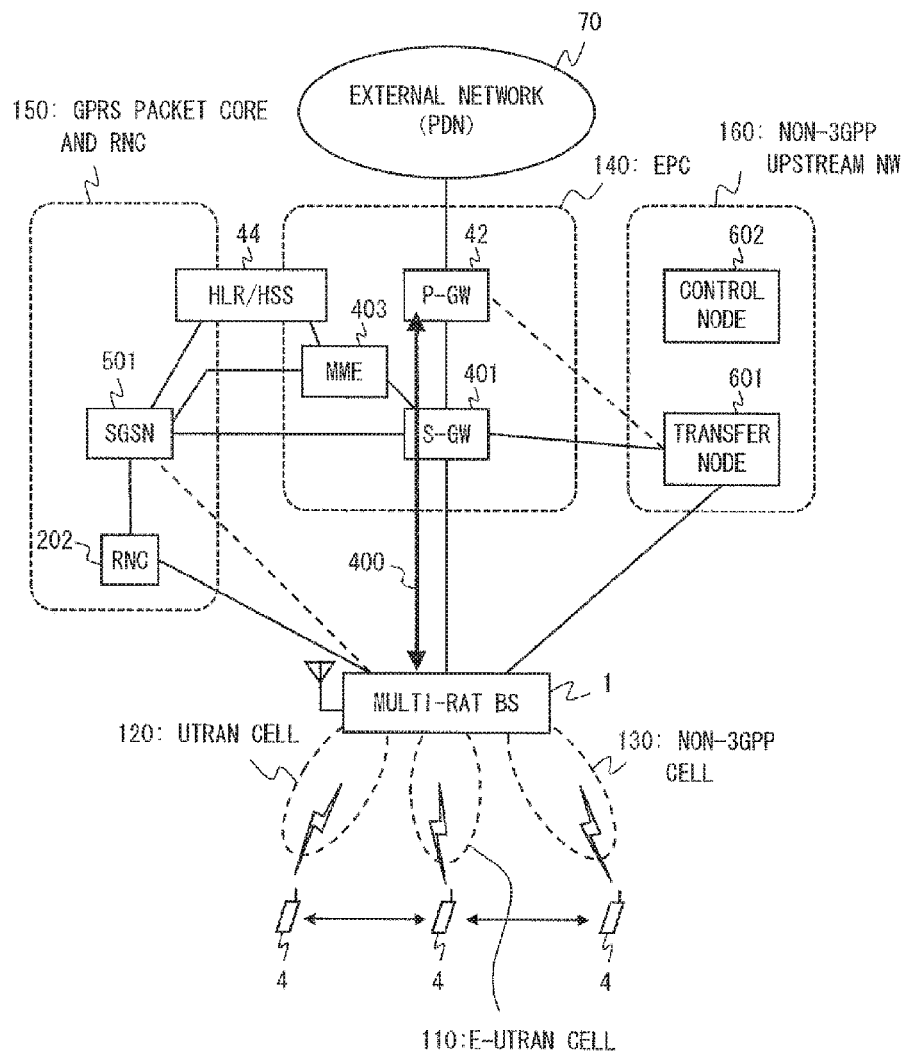
FIG. 9 is a diagram showing a configuration example of a radio communication system including a base station according to a fourth embodiment.

This embodiment illustrates a specific example in which E-UTRAN is used as the first RAT and UTRAN or a non-3GPP RAT is used as the second RAT in the second and third embodiments described above. FIG. 9 is a diagram showing a configuration example of the radio communication system including the Multi-RAT base station 1 according to this embodiment. In the example shown in FIG. 9, the base station 1 supports three types of RATs, specifically, E-UTRAN, UTRAN, and a non-3GPP RAT (e.g., cdma2000, WiMAX, or a wireless LAN). The base station 1 generates an E-UTRAN cell as the first cell 110 and generates a UTRAN cell as the second cell 120. The base station 1 also generates a non-3GPP cell as a third cell 130 corresponding to the non-3GPP RAT.

The first upstream network 140 shown in FIG. 9 is the EPC corresponding to E-UTRAN. An S-GW 401 and a P-GW 42 correspond to the transfer nodes 141 and 142, respectively. An MME 403 corresponds to the control node 143. In this embodiment, the communication path 400 is a communication path for user data that is established between a P-GW and a base station (eNB) of E-UTRAN. In other words, the communication path 400 of this embodiment corresponds to an EPS (Evolved Packet System) bearer including a GTP tunnel (S1 bearer) which is established between the base station 1 and the S-GW 401, and a GTP tunnel (S5/S8 bearer) or a GRE tunnel which is established between the S-GW 401 and the P-GW 42.

The second upstream network 150 shown in FIG. 9 is a GPRS packet core and an RNC of UTRAN. An SGSN 501 corresponds to the transfer node 151 and the control node 152. An RNC 202 also corresponds to the transfer node 151 and the control node 152.

A third upstream network 160 shown in FIG. 9 is a non-3GPP upstream network of the non-3GPP RAT. The third upstream network 160 includes a transfer node 601 and a control node 602.

The Multi-RAT base station 1 shown in FIG. 9 is configured not to change the route of the EPS bearer 400, which is established between the base station 1 and the P-GW 42, before and after the Inter-RAT handover of the mobile station 4 from the E-UTRAN cell 110 to the UTRAN cell 120 or the non-3GPP cell 130. In other words, when the mobile station 4 performs the handover from the E-UTRAN cell 110 to the UTRAN cell 120 or the non-3GPP cell 130, the base station 1 continuously uses the EPS bearer 400, which is established before the handover, for transfer of user data even after the Inter-RAT handover, without changing the route of the EPS bearer 400 so that it passes through the second upstream network 150 or the third upstream network 160.

Figure 10:
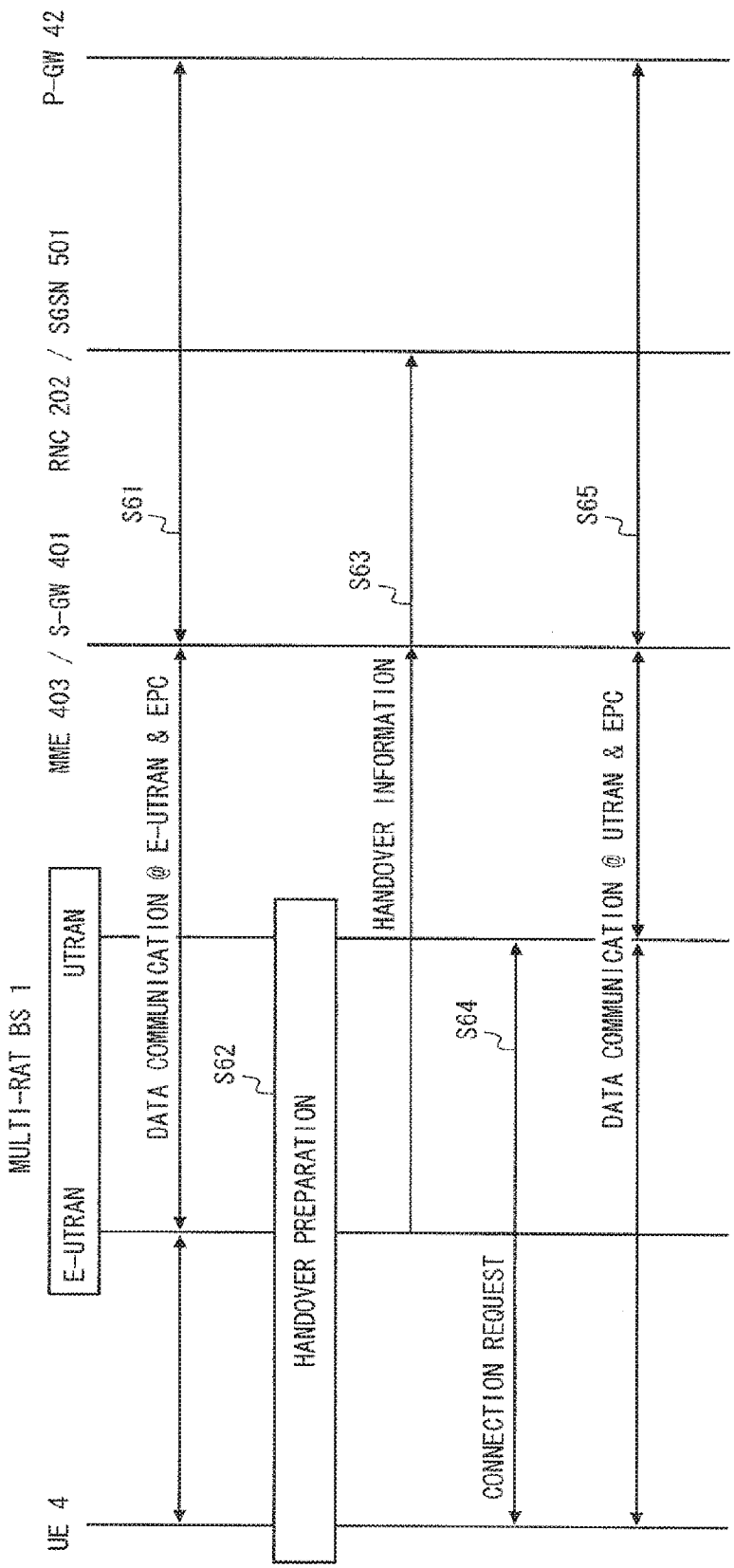
FIG. 10 is a sequence diagram showing an example of an Inter-RAT handover procedure (from E-UTRAN to UTRAN) according to the fourth embodiment.

FIG. 10 is a sequence diagram showing an example of the Inter-RAT handover procedure from the E-UTRAN cell 110 to the UTRAN cell 120 in this embodiment. FIG. 10 corresponds to the procedure (FIG. 7) involving the transmission of the handover information described in the third embodiment. Step S61 shown in FIG. 10 is similar to step S21 shown in FIG. 7. Specifically, in step S61, the mobile station 4 is connected to the Multi-RAT base station 1 via E-UTRAN and performs data communication with the P-GW 42 through the base station 1 and the EPC 140. Step S62 shown in FIG. 10 is similar to step S22 shown in FIG. 7. Specifically, in step S62, the base station 1 determines the execution of the Inter-RAT handover from E-UTRAN to UTRAN, and the base station 1 and the mobile station 4 prepare for the Inter-RAT handover.

Step S63 shown in FIG. 10 is similar to steps S41-1 and S41-2 shown in FIG. 7. Specifically, in step S63, the base station 1 sends handover information to the MME 403 and the S-GW 401 which are disposed in the first upstream network (EPC) 140. The MME 403 notifies the RNC 202 and the SGSN 501, which are disposed in the second upstream network (GPRS packet core and RNC) 150, of the handover information.

Step S64 shown in FIG. 10 is similar to step S23 shown in FIG. 7. Specifically, in step S64, the mobile station 4 sends a connection request to the base station 1 via the RAT of UTRAN, and is connected to the UTRAN cell 120. Step S65 shown in FIG. 10 is similar to step S24 shown in FIG. 7. Specifically, in step S65, the mobile station 4 is connected to the Multi-RAT base station 1 via UTRAN and performs data communication with the P-GW 42 through the base station 1 and the first upstream network (EPC) 140.

Figure 11:
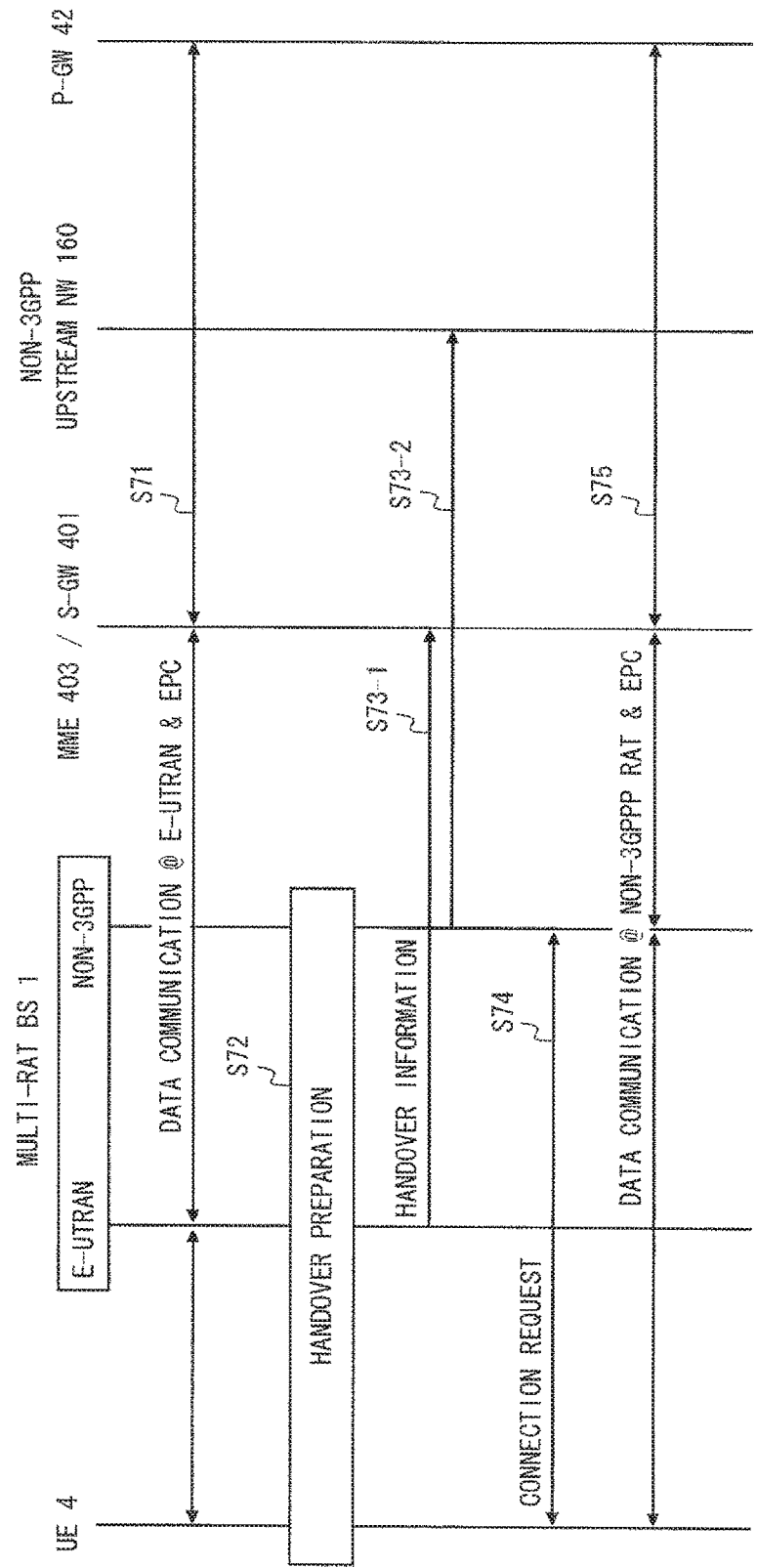
FIG. 11 is a sequence diagram showing an example of an Inter-RAT handover procedure (from E-UTRAN to non-3GPP RAT) according to the fourth embodiment.

Next, the Inter-RAT handover from the E-UTRAN cell 110 to the non-3GPP cell 130 will be described. FIG. 11 is a sequence diagram showing an example of the Inter-RAT handover procedure from the E-UTRAN cell 100 to the non-3GPP cell 130 in this embodiment. FIG. 11 also corresponds to the procedure (FIG. 7) involving the transmission of the handover information described in the third embodiment. Step S71 shown in FIG. 11 is similar to step S21 shown in FIG. 7. Specifically, in step S71, the mobile station 4 is connected to the Multi-RAT base station 1 via E-UTRAN, and performs data communication with the P-GW 42 through the base station 1 and the EPC 140. Step S72 shown in FIG. 11 is similar to step S22 shown in FIG. 7. Specifically, in step S72, the base station 1 determines the execution of the Inter-RAT handover from E-UTRAN to the non-3GPP RAT, and the base station 1 and the mobile station 4 prepare for the Inter-RAT handover.

Steps S73-1 and S73-2 shown in FIG. 11 are similar to steps S41-1 and S41-2 shown in FIG. 7. Specifically, in steps S73-1 and S73-2, the Multi-RAT base station 1 sends handover information to the first upstream network (EPC) 140 and the third upstream network (non-3GPP upstream network) 160.

Step S74 shown in FIG. 11 is similar to step S23 shown in FIG. 7. Specifically, in step S74, the mobile station 4 sends a connection request to the base station 1 via the non-3GPP RAT, and is connected to the non-3GPP cell 130. Step S75 shown in FIG. 11 is similar to step S24 shown in FIG. 7. Specifically, in step S75, the mobile station 4 is connected to the Multi-RAT base station 1 via the non-3GPP RAT, and performs data communication with the P-GW 42 through the base station 1 and the first upstream network (EPC) 140.

This embodiment illustrates a specific example in which the Multi-RAT base station 1 supports three types of RATs. However, the Multi-RAT base station 1 may support only two types of RATs, or may support four or more types of RATs.

This embodiment also illustrates an example in which the procedure (FIG. 7) involving the transmission of the handover information described in the third embodiment is applied to the handover between E-UTRAN and UTRAN and to the handover between E-UTRAN and the non-3GPP RAT. However, the procedure (FIG. 4) described in the second embodiment that does not involve the transmission of the handover information can also be applied to the Inter-RAT handover between E-UTRAN and UTRAN and to the Inter-RAT handover between E-UTRAN and the non-3GPP RAT.

Fifth Embodiment

The first embodiment described above illustrates an operation in which the Multi-RAT base station 1 uses, for transfer of user data, the communication path with the upstream network which does not correspond to the RAT used for connection of the Multi-RAT base station 1 with the mobile station 4. This embodiment illustrates a specific example of this operation in which a communication path for transfer of user data is selected from among communication paths (including the communication path 400) that pass through different routes in upstream networks (including the upstream networks 140 and 150). A configuration example of a mobile communication system according to this embodiment may be similar to the example of the first embodiment shown in FIG. 1. The configuration of the Multi-RAT base station according to this embodiment may be similar to that of the block diagram shown in FIG. 2.

The Multi-RAT base station 1 according to this embodiment selects a communication path for transfer of user data from among communication paths (including the communication path 400) that pass through different routes in upstream networks (including the upstream networks 140 and 150). The selection of a communication path (or an upstream network) may be carried out, for example, (a) during the attach procedure associated with power-on or cell re-selection of the mobile station 4, (b) during the handover of the mobile station 4 from a nearby cell, or (c) during the Inter-RAT handover of the mobile station 4 under the base station 1. The Multi-RAT base station 1 can use various conditions for selecting a communication path for transfer of user data. Some specific examples of the conditions for selecting a communication path will be described below.

Specific Example 1

Load of Upstream Networks

The base station 1 selects a communication path for transfer of user data from among communication paths that pass through different paths in upstream networks (including the upstream networks 140 and 150), based on a load of at least one of the upstream networks. Specifically, the base station 1 may preferentially select, as the communication path for transfer of user data, a communication path that passes through an upstream network having a relatively low load among the upstream networks. As a more detailed example, the base station 1 may preferentially select, as the communication path for transfer of user data, a communication path that passes through an upstream network having the lowest load among the upstream networks.

The load of the upstream networks may be evaluated based on, for example, the processing load of the transfer node or control node disposed in the upstream networks, or the congestion state of the communication link. The base station 1 may recognize the load of the upstream networks by a notification from at least one of the plurality of upstream networks. Alternatively, the base station 1 may recognize the load of the upstream networks by a notification from an OAM (Operations Administration and Maintenance) server managed by a telecommunications carrier.

The selection of the communication path for transfer of user data in consideration of the load of the upstream networks enables load distribution among the upstream networks. This leads to an improvement in communication capacity and an improvement in throughput.

Specific Example 2

RAT Used in Nearby Cell

The base station 1 selects a communication path for transfer of user data from among a plurality of communication paths, based on a RAT used by a nearby cell of the base station 1. Specifically, the base station 1 may preferentially select, as the communication path for transfer of user data, a communication path that passes through the upstream network corresponding to a RAT used by at least one nearby base station disposed in the vicinity of the base station 1. As a more detailed example, the base station 1 may select, as the communication path for transfer of user data, a communication path that passes through the upstream network corresponding to the RAT, which is most commonly used by one or more nearby base stations, among the plurality of RATs supported by the base station 1 itself.

The base station 1 may recognize a RAT used in the nearby cell by a notification from the upstream networks. Alternatively, the base station 1 may recognize the RAT is used in the nearby cell by a notification from an OAM server. In one more alternative, the base station 1 may directly receive a status of use of a RAT from nearby base stations via communication interfaces with nearby base stations.

The selection of the communication path that passes through the upstream network corresponding to the RAT used in the nearby cell makes it only necessary to perform handover processing in a common upstream network when the mobile station 4 performs a handover from the base station 1 to the nearby cell. This leads to a reduction in delay of the handover processing.

Specific Example 3

The Presence and Availability of Upstream Networks

The base station 1 selects a communication path used for transfer of user data from among a plurality of communication paths, based on whether or not upstream networks (including the upstream networks 140 and 150) are available to the base station 1. Specifically, the base station 1 may preferentially select, as the communication path for transfer of user data, a communication path that passes through an upstream network available to the base station 1. This allows the base station 1 to use, for the radio link with the mobile station 4, the RAT in which the corresponding upstream network is unavailable or not present.

Figure 12:
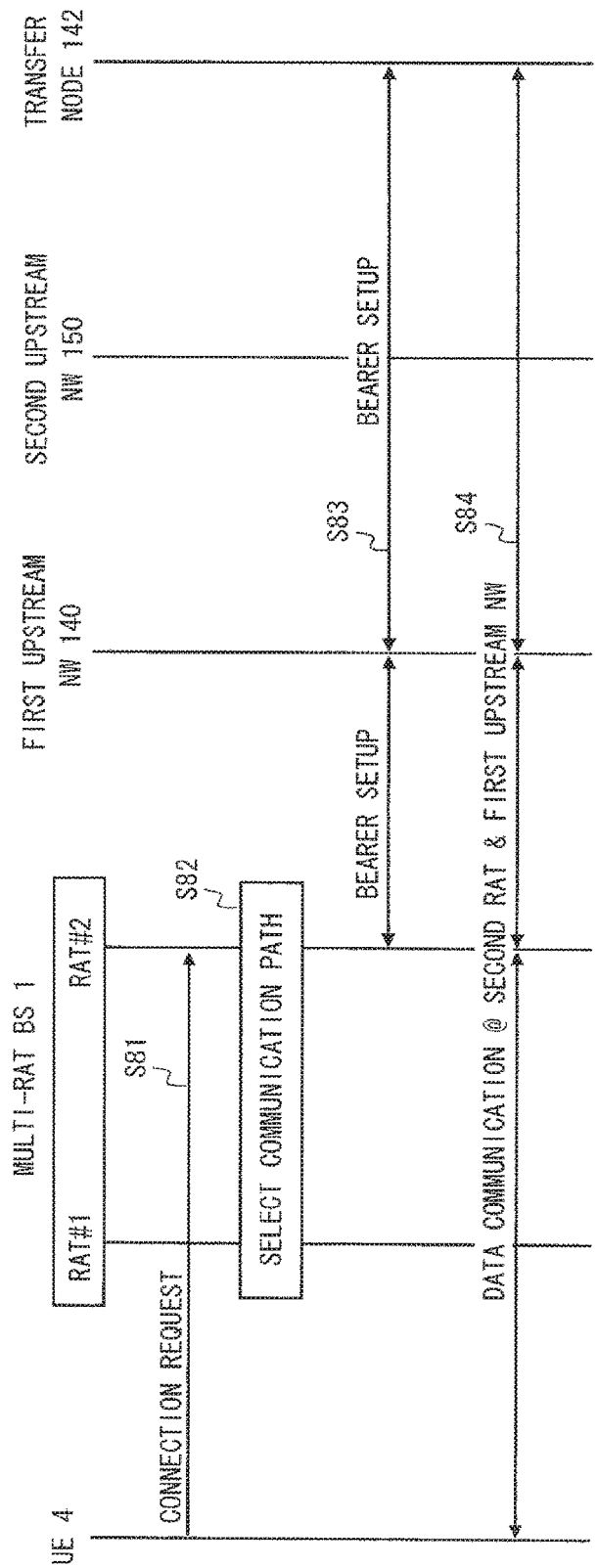
FIG. 12 is a sequence diagram showing an example of a communication procedure (mobile station attach procedure) according to a fifth embodiment.

FIG. 12 is a sequence diagram showing an example of a communication procedure according to this embodiment. Specifically, FIG. 12 illustrates an example in which when the mobile station 4 sends an attach request to the base station 1, a communication path with an upstream network is selected. In step S81, the mobile station 4 sends a connection request to the Multi-RAT base station 1 via the second RAT (the second cell 120), and is connected to the base station 1 via the second RAT. In step S82, the base station 1 selects a communication path for transfer of user data of the mobile station 4. In the example shown in FIG. 12, the base station 1 selects, as the communication path for transfer of user data, one of the communication path 400 (the communication path that passes through the first upstream network 140) and a communication path that passes through the second upstream network 150 corresponding to the second RAT. Here, a description is made assuming that the communication path 400 is selected.

In step S83, the base station 1 executes signaling for establishing the communication path 400 with the first upstream network 140 corresponding to the communication path 400. In step S84, the mobile station 4 is connected to the Multi-RAT base station 1 via the second RAT, and performs data communication with the P-GW 42 by using the communication path 400 that passes through the base station 1 and the first upstream network 140.

Figure 13:
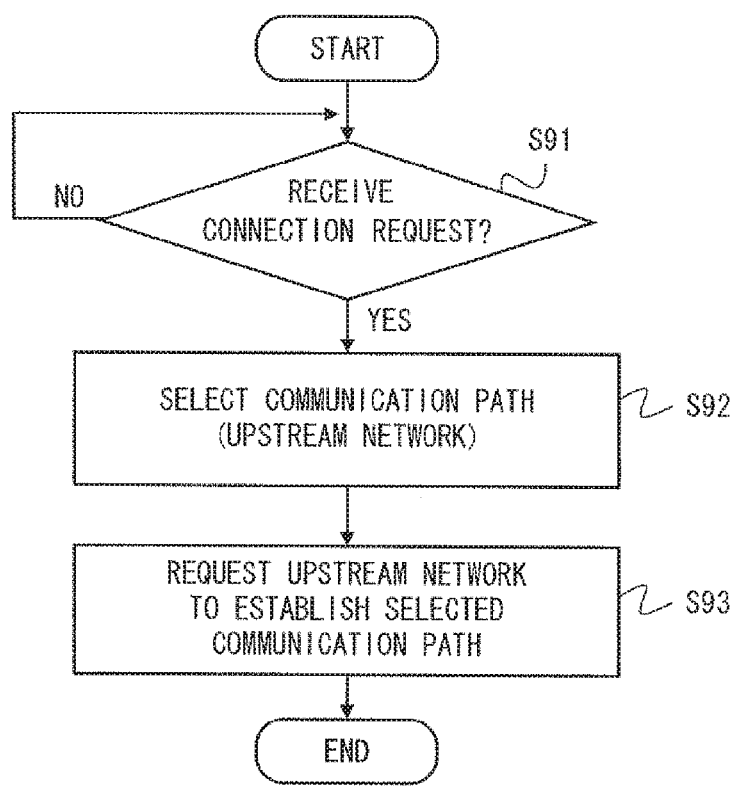
FIG. 13 is a flowchart showing an example of an operation performed by a base station during the mobile station attach procedure according to the fifth embodiment.
Figure 14:
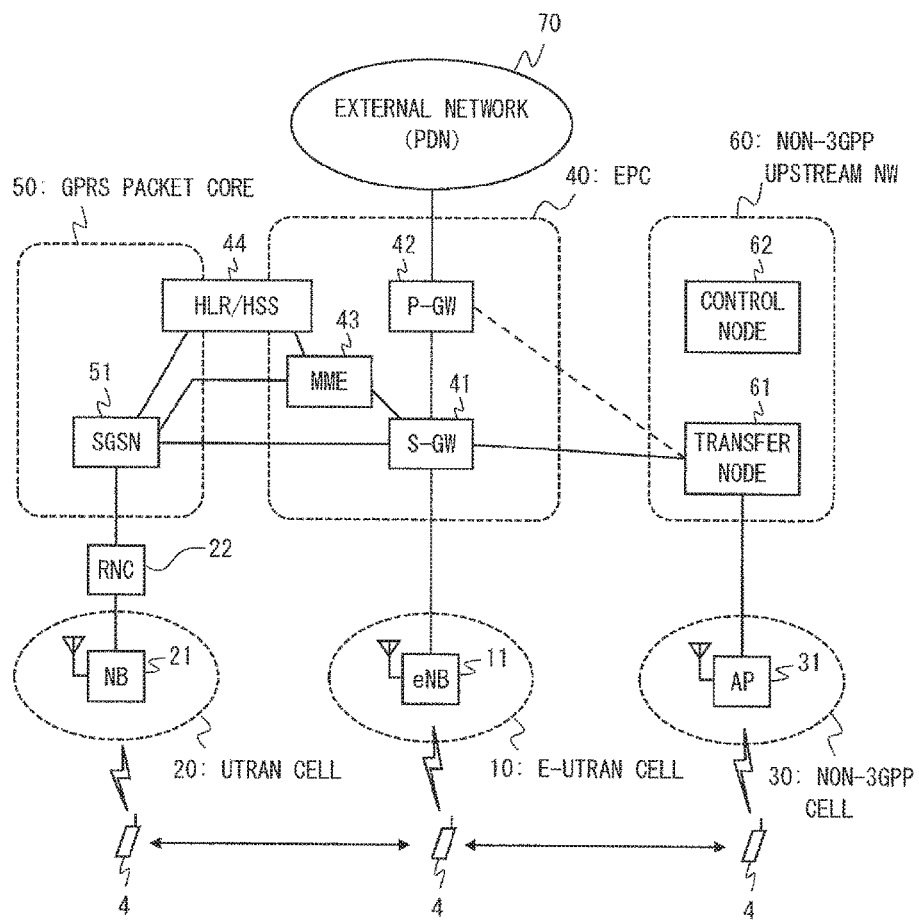
FIG. 14 is a diagram showing a first configuration example of a radio communication system according to the background art.

FIG. 13 is a flowchart showing an example of the operation performed by the base station 1 during the attach procedure for the mobile station 4 according to this embodiment. In step S91, the communication path control unit 103 determines whether or not the connection request from the mobile station 4 has been received. When the connection request from the mobile station 4 has been received (YES in step 91), the communication path control unit 103 selects a communication path with an upstream network (step S92). In step S93, the communication path control unit 103 requests the upstream network to establish the selected communication path.

Other Embodiments

The first to fifth embodiments described above illustrate specific examples of the Inter-RAT handover between E-UTRAN and UTRAN and the Inter-RAT handover between E-UTRAN and the non-3GPP RAT. However, the first to third embodiments described above may also be applied to other Inter-RAT handovers.

The first to fifth embodiments described above can be combined as appropriate. For example, in addition to performing the selection of a communication path with an upstream network as described in the fifth embodiment during the attach procedure for the mobile station 4, an operation for maintaining the communication path may be performed before and after the handover described in the second to fourth embodiments during the subsequent Inter-RAT handover.

The processings performed by the base station 1, the mobile station 4, and the nodes (such as the control node 143 and the transfer node 141) disposed in the upstream networks 140, 150, and 160 as described in the first to fifth embodiments may be implemented by causing a computer, such as a microprocessor or a DSP (Digital Signal Processor), to execute a program. Specifically, a program including an instruction set for causing a computer to execute an algorithm relating to the nodes, which have been described above with reference to the sequence diagrams and flowcharts of FIGS. 3, 4, 6, 7, 8, 10, 11, 12, and 13, may be created, and the program may be provided to the computer.

This program can be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer-readable media. Examples of transitory computer-readable media include electric signals, optical signals, and electromagnetic waves. Transitory computer-readable media can provide the program to a computer via a wired communication line, such as electric wires and optical fibers, or a wireless communication line.

Further, the embodiments described above are merely examples of the application of the technical idea obtained by the present inventors. That is, the technical idea is not limited only to the embodiments described above, but can be modified in various manners, as a matter of course.

For example, all or some of the embodiments disclosed above can be described as, but not limited to, the following supplementary notes.

(Supplementary Note 1)
A radio communication system comprising:
a base station connectable to a mobile station via first and second radio access technologies;
a first upstream network corresponding to the first radio access technology; and
a second upstream network corresponding to the second radio access technology,
wherein the base station is configured to control an inter-radio access technology handover to switch a connection with the mobile station from the first radio access technology to the second radio access technology, and is configured to continuously use, for data transfer between the mobile station and an external network, a communication path established between the base station and the first upstream network for the data transfer before the handover, even after the handover without changing a route of the communication path so that the communication path passes through the second upstream network.

(Supplementary Note 2)
The radio communication system according to Supplementary note 1, wherein during the handover, the base station sends, to at least one of the first and second upstream networks, a control message for notifying that switching of the communication path is unnecessary.

(Supplementary Note 3)
The radio communication system according to Supplementary note 1 or 2, wherein the communication path is a bearer established between the base station and a transfer node that is disposed in the first upstream network and operates as a gateway to the external network.

(Supplementary Note 4)
The radio communication system according to any one of Supplementary notes 1 to 3, wherein the first radio access technology is an E-UTRAN (Evolved UMTS Terrestrial Radio Access Network) of 3GPP (3rd Generation Partnership Project), and
the first upstream network includes an EPC (Evolved Packet Core) of 3GPP.

(Supplementary Note 5)
The radio communication system according to Supplementary note 4, wherein
the second radio access technology is a UTRAN of 3GPP, and
the second upstream network includes a GPRS (General Packet Radio Service) packet core of 3GPP.

(Supplementary Note 6)
The radio communication system according to Supplementary note 4, wherein
the second radio access technology is a non-3GPP radio access technology, and
the second upstream network includes a non-3GPP radio access network connectable to the first upstream network.

(Supplementary Note 7)
A base station connectable to a mobile station via first and second radio access technologies, the base station comprising:
a control unit that controls an inter-radio access technology handover to switch a connection with the mobile station from the first radio access technology to the second radio access technology,
wherein the control unit continuously uses, for data transfer between the mobile station and an external network, a communication path established between the base station and a first upstream network corresponding to the first radio access technology for the data transfer before the handover, even after the handover without changing a route of the communication path so that the communication path passes through a second upstream network corresponding to the second radio access technology.

(Supplementary Note 8)
The base station according to Supplementary note 7, wherein during the handover, the base station sends, to at least one of the first and second upstream networks, a control message for notifying that switching of the communication path is unnecessary.

(Supplementary Note 9)
The base station according to Supplementary note 7 or 8, wherein the communication path is a bearer established between the base station and a transfer node that is disposed in the first upstream network and operates as a gateway to the external network.

(Supplementary Note 10)
The base station according to any one of Supplementary notes 7 to 9, wherein
the first radio access technology is an E-UTRAN (Evolved UMTS Terrestrial Radio Access Network) of 3GPP (3rd Generation Partnership Project), and
the first upstream network includes an EPC (Evolved Packet Core) of 3GPP.

(Supplementary Note 11)
The base station according to Supplementary note 10, wherein
the second radio access technology is a UTRAN of 3GPP, and
the second upstream network includes a GPRS (General Packet Radio Service) packet core of 3GPP.

(Supplementary Note 12)
The base station according to Supplementary note 10, wherein
the second radio access technology is a non-3GPP radio access technology, and
the second upstream network includes a non-3GPP radio access network connectable to the first upstream network.

(Supplementary Note 13)

A method for controlling an inter-radio access technology handover performed by a base station that is connectable to a mobile station via first and second radio access technologies, the method comprising:

controlling an inter-radio access technology handover to switch a connection with the mobile station from the first radio access technology to the second radio access technology; and continuously using, for data transfer between the mobile station and an external network, a communication path established between the base station and a first upstream network corresponding to the first radio access technology for the data transfer before the handover, even after the handover without changing a route of the communication path so that the communication path passes through a second upstream network corresponding to the second radio access technology.

(Supplementary Note 14)

The method according to Supplementary note 13, further comprising transmitting, to at least one of the first and second upstream networks, a control message for notifying that switching of the communication path is unnecessary, during the handover.

(Supplementary Note 15)

The method according to Supplementary note 13 or 14, wherein the communication path is a bearer established between the base station and a transfer node that is disposed in the first upstream network and operates as a gateway to the external network.

(Supplementary Note 16)

A mobile station that is connectable to a base station according to any one of Supplementary notes 7 to 12 via the first and second radio access technologies.

(Supplementary Note 17)

A program for causing a computer to execute a method according to any one of Supplementary notes 13 to 15.

This application is based upon and claims the benefit of priority from Japanese patent application No. 2011-176785, filed on Aug. 12, 2011, the disclosure of which is incorporated herein in its entirety by reference.

REFERENCE SIGNS LIST

1 MULTI-RAT BASE STATION
4 MOBILE STATION
70 EXTERNAL NETWORK
101-1 RADIO COMMUNICATION UNIT
101-2 RADIO COMMUNICATION UNIT
102 COMMUNICATION UNIT
103 COMMUNICATION PATH CONTROL UNIT
110 FIRST CELL (e.g., E-UTRAN CELL) BY FIRST RAT
120 SECOND CELL (e.g., UTRAN CELL) BY SECOND RAT
130 THIRD CELL (e.g., NON-3GPP CELL) BY THIRD RAT
140 FIRST UPSTREAM NETWORK (e.g., EPC)
141 TRANSFER NODE
142 TRANSFER NODE
143 CONTROL NODE
150 SECOND UPSTREAM NETWORK (e.g., GPRS PACKET CORE AND RNC)
151 TRANSFER NODE
152 CONTROL NODE
160 THIRD UPSTREAM NETWORK (e.g., NON-3GPP UPSTREAM NETWORK)
161 TRANSFER NODE
162 CONTROL NODE
400 COMMUNICATION PATH (BEARER)

The invention claimed is:

1. A radio communication system comprising:
a base station connectable to a mobile station using a plurality of radio access technologies including first and second radio access technologies; and
an upstream network corresponding to the first radio access technology,
wherein the base station is configured to, when the mobile station communicate with the base station using the second radio access technology, use a communication path that passes through the upstream network without passing through another upstream network.

2. The radio communication system according to claim 1, wherein when an inter-radio access technology handover is performed to switch a connection with the mobile station from the first radio access technology to the second radio access technology, the base station is configured to continuously use the communication path, established before the handover, for a data transfer even after the handover.

3. The radio communication system according to claim 2, wherein during the handover, the base station sends, to the upstream network, a control message for notifying that switching of the communication path is unnecessary.

4. The radio communication system according to claim 1, wherein the communication path is a bearer established between the base station and a transfer node that is disposed in the upstream network and operates as a gateway to an external network.

5. The radio communication system according to claim 1, wherein
the first radio access technology is an E-UTRAN (Evolved UMTS Terrestrial Radio Access Network) of 3GPP (3rd Generation Partnership Project), and
the upstream network includes an EPC (Evolved Packet Core) of 3GPP.

6. The radio communication system according to claim 5, wherein the second radio access technology is a UTRAN of 3GPP.

7. The radio communication system according to claim 5, wherein the second radio access technology is a non-3GPP radio access technology.

8. A base station connectable to a mobile station using a plurality of radio access technologies including first and second radio access technologies and also connectable to an upstream network corresponding to the first radio access technology, the base station comprising:
a communication path control unit configured to use, when the mobile station communicate with the base station using the second radio access technology, a communication path that passes through the upstream network without passing through another upstream network.

9. The base station according to claim 8, wherein when an inter-radio access technology handover is performed to switch a connection with the mobile station from the first radio access technology to the second radio access technology, the communication path control unit continuously uses the communication path, established before the handover, for a data transfer even after the handover.

10. The base station according to claim 9, wherein during the handover, the communication path control unit sends, to the upstream network, a control message for notifying that switching of the communication path is unnecessary.

11. The base station according to claim 8, wherein the communication path is a bearer established between the base station and a transfer node that is disposed in the upstream network and operates as a gateway to an external network.

12. A communication method for a base station connectable to a mobile station using a plurality of radio access technologies including first and second radio access technologies and also connectable to an upstream network corresponding to the first radio access technology, the communication method comprising:
using, when the mobile station communicate with the base station using the second radio access technology, a communication path that passes through the upstream network without passing through another network.

13. The method according to claim 12, wherein when an inter-radio access technology handover is performed to switch a connection with the mobile station from the first radio access technology to the second radio access technology, said using the communication path includes continuously using the communication path, established before the handover, for a data transfer even after the handover.

14. The method according to claim 13, further comprising sending, to the first upstream network, a control message for notifying that switching of the communication path is unnecessary, during the handover.

15. The method according to claim 12, wherein the communication path is a bearer established between the base station and a transfer node that is disposed in the upstream network and operates as a gateway to an external network.

16. A mobile station used in a radio communication system,
the radio communication system comprising:
an upstream network corresponding to a first radio access technology; and
a base station that is configured to be connectable to the mobile station using a plurality of radio access technologies including the first radio access technology and a second radio access technology, and is configured to, when the mobile station communicate with the base station using the second radio access technology, use a communication path that passes through the upstream network without passing through another upstream network, and
the mobile station is configured to be connected to the base station using at least one of the first and second radio access technologies.

17. The mobile station according to claim 16, wherein the mobile station is configured to perform an inter-radio access technology handover to switch a connection with the base station from the first radio access technology to the second radio access technology, and also configured to continuously uses the communication path, established before the handover, for a data transfer even after the handover.

18. A non-transitory computer-readable medium storing a program for causing a computer to execute a communication method for a base station, wherein the base station is connectable to a mobile station using a plurality of radio access technologies including first and second radio access technologies and also connectable to an upstream network corresponding to the first radio access technology, and
the method comprises controlling the base station so as to, when the mobile station communicate with the base station using the second radio access technology, use a communication path that passes through the upstream network without passing through another upstream network.

* * * * *